US009545151B2

(12) United States Patent
Kaelin

(10) Patent No.: US 9,545,151 B2
(45) Date of Patent: Jan. 17, 2017

(54) APPARATUS FOR HOLDING AND RETAINING GLASS ARTICLES

(71) Applicant: Corning Incorporated, Corning, NY (US)

(72) Inventor: Kevin Robert Kaelin, Pine City, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/808,728

(22) Filed: Jul. 24, 2015

(65) Prior Publication Data
US 2016/0157606 A1 Jun. 9, 2016

Related U.S. Application Data

(60) Provisional application No. 62/089,057, filed on Dec. 8, 2014.

(51) Int. Cl.
*A47B 73/00* (2006.01)
*B08B 9/42* (2006.01)
(Continued)

(52) U.S. Cl.
CPC .............. *A47B 73/004* (2013.01); *B08B 9/42* (2013.01); *B65D 25/04* (2013.01); *C03C 21/002* (2013.01); *C03C 23/0075* (2013.01); *A47B 73/00* (2013.01)

(58) Field of Classification Search
CPC ..... A47B 73/00; A47B 73/004; C03C 21/002; C03C 23/0075; B65D 25/04; B65D 25/10; B65D 81/02
(Continued)

(56) References Cited

U.S. PATENT DOCUMENTS 431,862 A * 7/1890 Abrams ................. A47F 5/112
211/69
659,328 A * 10/1900 Strauss .............. B65D 5/48024
206/427
(Continued)

FOREIGN PATENT DOCUMENTS

CN 201641040 U 11/2010
DE 2255316 A1 5/1974
(Continued)

OTHER PUBLICATIONS

International Search Report & Written Opinion mailed Oct. 29, 2015 for PCT/US2015/042012 filed Jul. 24, 2015. pp. 1-9.
(Continued)

*Primary Examiner* — Joshua J Michener
*Assistant Examiner* — Devin Barnett
(74) *Attorney, Agent, or Firm* — Dinsmore & Shohl LLP

(57) ABSTRACT

A magazine apparatus may hold and retain glass articles. The magazine apparatus may comprise a base frame, a back plate, and a plurality of receiving racks. The base frame may define a front plane and a back plane. The back plate may be connected to the base frame and positioned in the back plane defined by the base frame. The plurality of receiving racks may be supported in the base frame between the front plane and the back plane. Each receiving rack may be parallel to and spaced apart from adjacent receiving racks in a vertical direction and comprise a plurality of receiving slots for receiving at least a portion of a glass article. The receiving slots may be arrayed in a linear array over a length of each receiving rack and open towards the front plane of the base frame.

17 Claims, 8 Drawing Sheets

(51) Int. Cl.
 *C03C 21/00* (2006.01)
 *C03C 23/00* (2006.01)
 *B65D 25/04* (2006.01)

(58) Field of Classification Search
 USPC ... 211/85.18, 85.13, 69, 71.01, 70.6, 74, 50; 206/433
 See application file for complete search history.

(56) References Cited

U.S. PATENT DOCUMENTS

| | | | | |
|---|---|---|---|---|
| 664,475 A * | 12/1900 | Graves | | B25H 3/04 |
| | | | | 206/349 |
| 827,649 A * | 7/1906 | Murphy | | A47B 63/02 |
| | | | | 211/74 |
| 837,224 A * | 11/1906 | Holcomb | | A47B 67/02 |
| | | | | 206/803 |
| 1,117,824 A * | 11/1914 | Fleming | | A47F 5/112 |
| | | | | 206/371 |
| 1,798,779 A * | 3/1931 | Bowersock | | B65D 5/5033 |
| | | | | 206/591 |
| 1,800,713 A * | 4/1931 | Bowersock | | B65D 5/5035 |
| | | | | 206/586 |
| 1,828,837 A * | 10/1931 | Gagen | | B65D 5/48038 |
| | | | | 206/433 |
| 1,980,930 A * | 11/1934 | Reyniers | | B01L 9/06 |
| | | | | 211/74 |
| 2,191,488 A * | 2/1940 | McCowan | | A47F 7/288 |
| | | | | 100/102 |
| 2,206,686 A | 7/1940 | Bauman | | |
| 2,256,663 A | 9/1941 | Brewer | | |
| 2,269,940 A * | 1/1942 | Johnson | | A47L 13/51 |
| | | | | 211/119.004 |
| 2,334,839 A * | 11/1943 | Purchas | | A47G 21/14 |
| | | | | 206/372 |
| 2,520,818 A | 8/1950 | Terry | | |
| 2,760,647 A * | 8/1956 | Saul | | A47B 57/30 |
| | | | | 211/182 |
| 2,802,649 A * | 8/1957 | Stockton | | B01F 7/1695 |
| | | | | 211/188 |
| 2,805,777 A * | 9/1957 | Larson | | B25H 3/04 |
| | | | | 211/106.01 |
| 2,916,156 A * | 12/1959 | Larson | | A47F 7/0028 |
| | | | | 211/69.9 |
| 2,979,246 A * | 4/1961 | Liebeskind | | B31B 7/00 |
| | | | | 156/245 |
| 3,187,902 A * | 6/1965 | Nelson | | B25H 3/04 |
| | | | | 211/70.6 |
| 3,370,696 A * | 2/1968 | Groe | | B25B 13/56 |
| | | | | 206/376 |
| 3,590,752 A * | 7/1971 | De Pew | | B65D 19/44 |
| | | | | 108/53.5 |
| 3,590,863 A | 7/1971 | Faust et al. | | |
| 3,765,635 A * | 10/1973 | Burrell | | F17C 13/084 |
| | | | | 211/85.18 |
| 3,780,972 A * | 12/1973 | Brodersen | | A62C 13/78 |
| | | | | 211/85.18 |
| 3,837,477 A * | 9/1974 | Boudreau | | B65D 5/50 |
| | | | | 206/376 |
| 4,040,234 A * | 8/1977 | Stockdale | | B01L 9/06 |
| | | | | 206/526 |
| 4,068,798 A * | 1/1978 | Rohde | | B01L 3/50825 |
| | | | | 211/74 |
| 4,182,455 A * | 1/1980 | Zurawin | | B65D 71/70 |
| | | | | 211/69.8 |
| 4,241,546 A | 12/1980 | Ilk | | |
| 4,284,603 A | 8/1981 | Korom | | |
| 4,285,449 A * | 8/1981 | Campos | | B65D 71/0003 |
| | | | | 206/427 |
| 4,350,253 A * | 9/1982 | Rusteberg | | B01L 9/06 |
| | | | | 211/74 |
| 4,485,929 A * | 12/1984 | Betts, Sr. | | B01L 9/00 |
| | | | | 211/59.1 |
| 4,498,594 A | 2/1985 | Elder | | |
| 4,534,465 A | 8/1985 | Rothermel et al. | | |
| 4,583,647 A * | 4/1986 | Schinzing | | A47B 81/007 |
| | | | | 211/60.1 |
| 4,681,233 A * | 7/1987 | Roth | | B25H 3/04 |
| | | | | 211/70.6 |
| 4,871,074 A * | 10/1989 | Bryson | | A45D 20/12 |
| | | | | 211/26 |
| 5,036,989 A * | 8/1991 | Carilli | | B01L 9/06 |
| | | | | 211/60.1 |
| 5,148,919 A | 9/1992 | Rubin | | |
| 5,169,603 A | 12/1992 | Landsberger | | |
| 5,279,428 A * | 1/1994 | Lee | | A47F 7/0028 |
| | | | | 211/26 |
| 5,346,063 A * | 9/1994 | Chow | | B25H 3/04 |
| | | | | 206/376 |
| 5,360,309 A * | 11/1994 | Ishiguro | | B08B 9/423 |
| | | | | 414/404 |
| 5,375,716 A | 12/1994 | Rubin et al. | | |
| 5,384,103 A * | 1/1995 | Miller | | A61C 19/02 |
| | | | | 16/438 |
| 5,451,380 A * | 9/1995 | Zinnanti | | A61L 2/26 |
| | | | | 206/370 |
| 5,492,671 A * | 2/1996 | Krafft | | A61L 2/26 |
| | | | | 206/363 |
| 5,505,316 A * | 4/1996 | Lee | | B25H 3/04 |
| | | | | 206/376 |
| 5,544,747 A * | 8/1996 | Horn | | B25H 3/06 |
| | | | | 206/350 |
| 5,624,032 A * | 4/1997 | Yucknut | | B65D 5/4804 |
| | | | | 206/433 |
| 5,843,388 A * | 12/1998 | Arroyo | | A61L 2/26 |
| | | | | 206/369 |
| 5,888,830 A * | 3/1999 | Mohan | | B01J 19/0046 |
| | | | | 422/537 |
| 5,893,457 A * | 4/1999 | Wei | | B25H 3/003 |
| | | | | 206/373 |
| 5,967,340 A * | 10/1999 | Kao | | B25H 3/04 |
| | | | | 206/493 |
| 5,988,382 A * | 11/1999 | Ritchie | | B25H 3/04 |
| | | | | 206/372 |
| 6,113,202 A * | 9/2000 | Germano | | B25H 1/12 |
| | | | | 206/373 |
| 6,132,684 A | 10/2000 | Marino | | |
| 6,193,064 B1 | 2/2001 | Finneran | | |
| 6,193,081 B1 * | 2/2001 | Ewing | | A47F 1/12 |
| | | | | 206/277 |
| 6,230,888 B1 * | 5/2001 | Frieze | | A61B 50/22 |
| | | | | 206/370 |
| 6,244,447 B1 * | 6/2001 | Frieze | | A61L 2/07 |
| | | | | 206/370 |
| 6,257,409 B1 * | 7/2001 | Lin | | B25H 3/04 |
| | | | | 206/376 |
| 6,279,760 B1 * | 8/2001 | Broeski | | A47B 81/007 |
| | | | | 206/149 |
| 6,290,680 B1 | 9/2001 | Forsberg et al. | | |
| 6,299,000 B1 * | 10/2001 | Cabrera | | A63B 57/60 |
| | | | | 211/104 |
| 6,345,723 B1 | 2/2002 | Blake et al. | | |
| 6,354,543 B1 * | 3/2002 | Paske | | H01P 1/00 |
| | | | | 211/85.18 |
| 6,382,685 B1 * | 5/2002 | Hammond | | E05B 63/0069 |
| | | | | 292/145 |
| 6,443,316 B1 * | 9/2002 | Mao | | A47F 5/0807 |
| | | | | 211/41.3 |
| 6,481,583 B1 * | 11/2002 | Black | | A47F 5/0815 |
| | | | | 211/70.6 |
| 6,533,133 B2 | 3/2003 | Liu | | |
| 6,568,544 B1 | 5/2003 | Lafond et al. | | |
| 6,575,311 B1 * | 6/2003 | Fink | | A47F 7/0028 |
| | | | | 211/70.2 |
| 6,832,685 B2 * | 12/2004 | Chang | | B25H 3/003 |
| | | | | 206/372 |
| 7,213,592 B2 * | 5/2007 | Fischhaber | | F24C 15/16 |
| | | | | 126/337 R |

(56) References Cited

U.S. PATENT DOCUMENTS

| | | | | |
|---|---|---|---|---|
| 8,148,169 | B2* | 4/2012 | Gjerde | B01J 20/285 210/656 |
| 8,230,997 | B1* | 7/2012 | McWilliams | B65D 5/5038 206/139 |
| 8,875,885 | B2* | 11/2014 | Padden | B65D 81/022 206/433 |
| 8,955,697 | B2 | 2/2015 | Spilotro | |
| 9,403,270 | B2* | 8/2016 | Lin | B25H 3/02 |
| 2002/0070185 | A1* | 6/2002 | Chen | A47F 7/0028 211/70.6 |
| 2002/0108917 | A1 | 8/2002 | Maruyama | |
| 2004/0140277 | A1* | 7/2004 | Comartin | A63B 71/0036 211/59.1 |
| 2005/0207945 | A1 | 9/2005 | Itoh | |
| 2006/0198765 | A1* | 9/2006 | Gjerde | B01D 15/424 422/400 |
| 2007/0094924 | A1* | 5/2007 | Wingerden | A47G 7/07 47/41.13 |
| 2008/0185352 | A1 | 8/2008 | O'Hara | |
| 2010/0089938 | A1* | 4/2010 | Motadel | B01L 9/543 221/1 |
| 2010/0163502 | A1* | 7/2010 | Chang | B25H 3/04 211/70.6 |
| 2010/0258515 | A1* | 10/2010 | Chen | A47F 7/00 211/70.6 |
| 2011/0084039 | A1* | 4/2011 | Walters | A47F 7/0028 211/85.13 |
| 2011/0113974 | A1 | 5/2011 | D'Amato et al. | |
| 2011/0132853 | A1 | 6/2011 | Drobot et al. | |
| 2011/0200500 | A1* | 8/2011 | Feilders | B01L 7/00 422/537 |
| 2011/0240577 | A1* | 10/2011 | Jones | A61B 17/06061 211/85.13 |
| 2011/0293942 | A1 | 12/2011 | Cornejo et al. | |
| 2012/0051987 | A1* | 3/2012 | Johnson | B01L 9/06 422/562 |
| 2012/0085720 | A1* | 4/2012 | Bettenhausen | A61L 2/26 211/85.13 |
| 2012/0292273 | A1* | 11/2012 | McNamara | A47L 15/505 211/79 |
| 2012/0305507 | A1* | 12/2012 | Herchenbach | B01L 9/06 211/74 |
| 2013/0171456 | A1* | 7/2013 | Fadeev | C03C 17/005 428/429 |
| 2013/0219965 | A1 | 8/2013 | Allan et al. | |
| 2013/0277322 | A1 | 10/2013 | Tiberio | |
| 2014/0112845 | A1* | 4/2014 | Edens | B01L 3/50853 422/569 |
| 2014/0166520 | A1* | 6/2014 | Hoppe | B65D 81/127 206/433 |
| 2014/0305825 | A1* | 10/2014 | Holley, Jr. | B65D 71/12 206/433 |
| 2014/0332428 | A1* | 11/2014 | Holley, Jr. | B65D 71/38 206/433 |
| 2014/0332429 | A1* | 11/2014 | Boersma | B65D 71/38 206/433 |
| 2015/0001116 | A1* | 1/2015 | Schmal | B65D 71/10 206/433 |
| 2015/0210457 | A1* | 7/2015 | Dimauro | B65D 81/113 206/433 |
| 2015/0246761 | A1* | 9/2015 | Holley, Jr. | B65D 71/36 206/433 |
| 2016/0052125 | A1* | 2/2016 | Steele | B25H 3/003 206/372 |
| 2016/0167041 | A1* | 6/2016 | Curry | B01L 3/0275 422/526 |

FOREIGN PATENT DOCUMENTS

| | | |
|---|---|---|
| DE | 2618522 A1 | 11/1977 |
| GB | 617777 A | 2/1949 |
| GB | 736837 A | 9/1955 |
| GB | 940041 A | 10/1963 |

OTHER PUBLICATIONS

International Search Report & Written Opinion mailed Oct. 23, 2015 for PCT/US2015/042016 filed Jul. 24, 2015. pp. 1-9.
International Search Report & Written Opinion mailed Nov. 2, 2015 for PCT/US2015/042033 filed Jul. 24, 2015. pp. 1-9.
International Search Report & Written Opinion mailed Oct. 29, 2015 for PCT/US2015/042007 filed Jul. 24, 2015. pp. 1-9.
International Search Report & Written Opinion mailed Aug. 30, 2016 for PCT/US2016/031647 filed May 10, 2016. pp. 1-12.

* cited by examiner

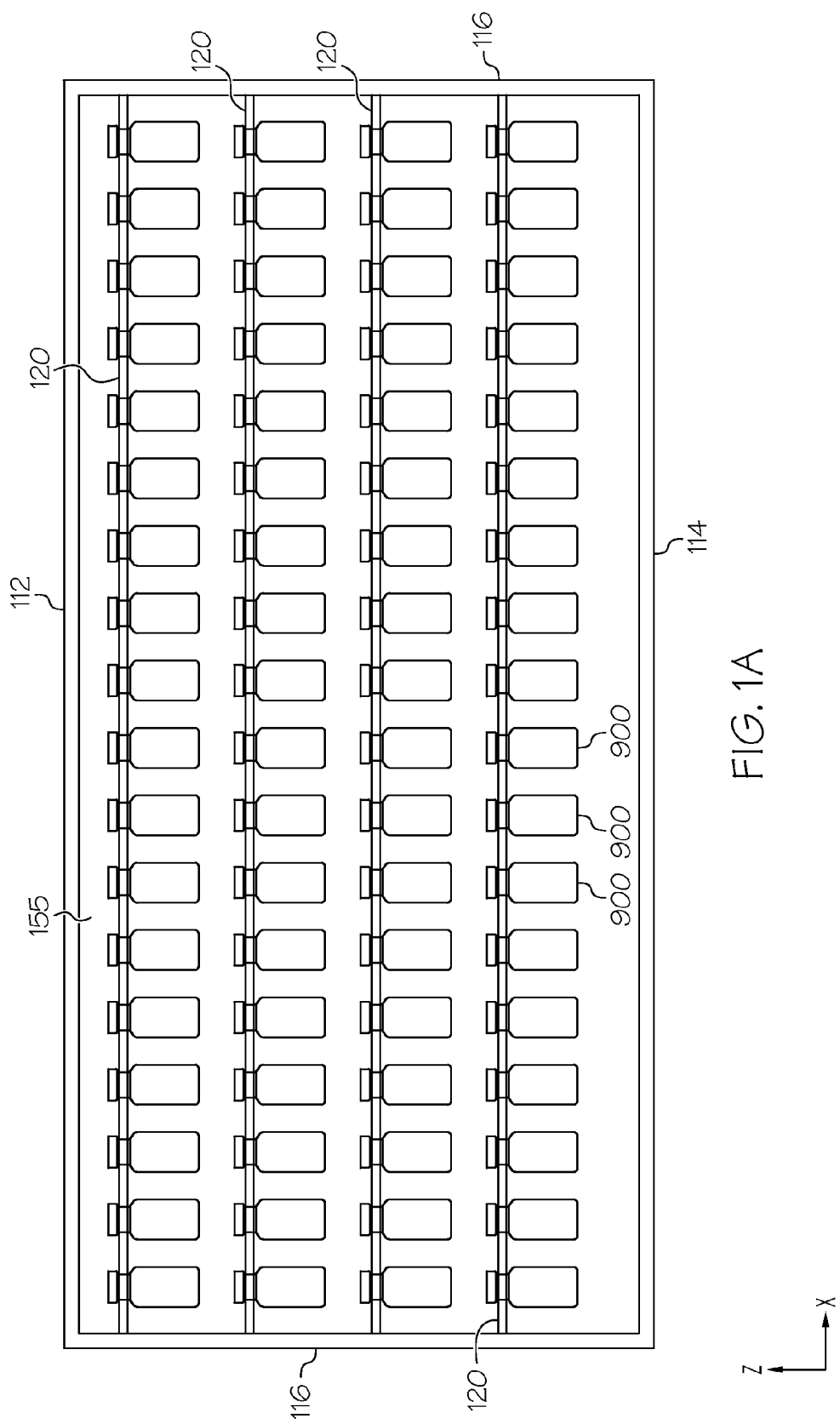

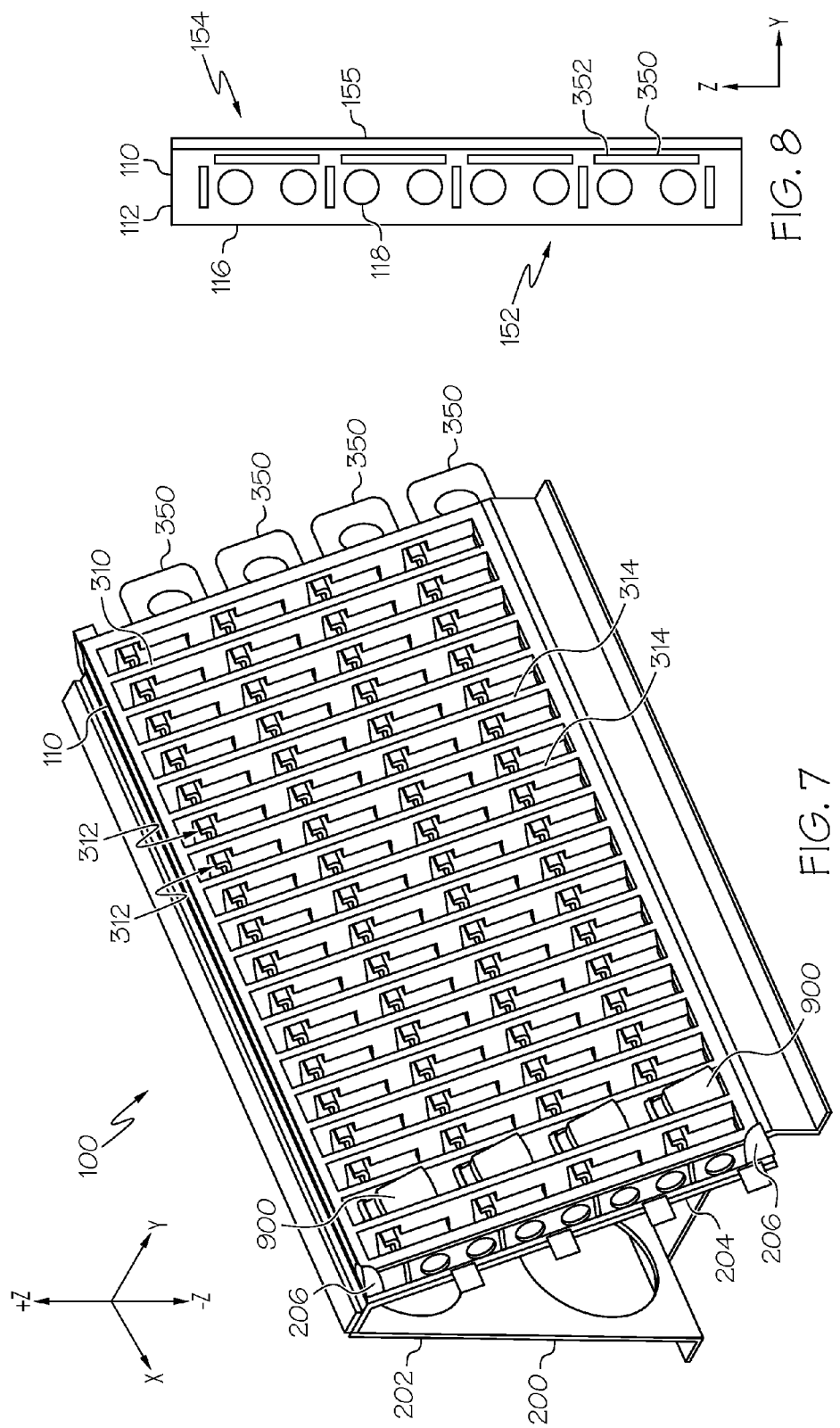

APPARATUS FOR HOLDING AND RETAINING GLASS ARTICLES

CROSS REFERENCE TO RELATED APPLICATIONS

The present application claims priority to U.S. Provisional Patent Application No. 62/089,057 filed Dec. 8, 2014 and entitled, "Apparatus for Holding and Retaining Glass Articles," the entirety of which is incorporated by reference herein.

BACKGROUND

Field

The present specification generally relates to apparatuses for holding glass articles during processing and, more specifically, to magazine apparatuses for holding glass articles during ion-exchange processing.

Technical Background

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent glass articles and contact between the glass and equipment, such as handling and/or filling equipment. Regardless of the source, the presence of these flaws may ultimately lead to glass breakage.

Accordingly, a need exists for alternative apparatuses for holding glass articles during processing to mitigate glass breakage while allowing for full contact of the interior and exterior regions of a glass article with processing baths, such as ion-exchange baths.

SUMMARY

According to one embodiment, a magazine apparatus may hold and retain glass articles. The magazine apparatus may comprise a base frame, a back plate, and a plurality of receiving racks. The base frame may define a front plane and a back plane and may be formed from a metallic material. The back plate may be connected to the base frame and positioned in the back plane defined by the base frame. The plurality of receiving racks may be formed from a metallic material and supported in the base frame between the front plane and the back plane. Each receiving rack may be parallel to and spaced apart from adjacent receiving racks in a vertical direction and comprise a plurality of receiving slots for receiving at least a portion of a glass article. The receiving slots may be arrayed in a linear array over a length of each receiving rack and open towards the front plane of the base frame. The magazine apparatus may further comprise at least one loading stop removably coupled to the base frame proximate the back plane. The loading stop may prevent glass articles suspended from the receiving racks from contacting the back plate as the magazine apparatus is manipulated.

In another embodiment, a magazine apparatus may hold and retain glass articles. The base frame may define a front plane and a back plane and may be formed from a metallic material. The back plate may be connected to the base frame and positioned in the back plane defined by the base frame. The plurality of receiving racks may be formed from a metallic material and supported in the base frame between the front plane and the back plane. Each receiving rack may be parallel to and spaced apart from adjacent receiving racks in a vertical direction and comprise a plurality of receiving slots for receiving at least a portion of a glass article. The receiving slots may be arrayed in a linear array over a length of each receiving rack and open towards the front plane of the base frame. The magazine apparatus may further comprise a loading grid comprising an array of ware receiving spaces separated by partitions of the loading grid. The loading grid may be removably positioned in the base frame so that each receiving slot is positioned in a ware receiving space of the loading grid.

In yet another embodiment, an assembly for holding and retaining glass articles may comprise a plurality of magazine apparatus. Each of the magazine apparatus may comprise a base frame, a back plate, and a plurality of receiving racks. The base frame may define a front plane and a back plane and be formed from a metallic material. The back plate may be connected to the base frame and positioned in the back plane defined by the base frame. The plurality of receiving racks may be formed from a metallic material and supported in the base frame between the front plane and the back plane. Each receiving rack may be parallel to and spaced apart from adjacent receiving racks in a vertical direction and may comprise a plurality of receiving slots for receiving at least a portion of a glass article. The receiving slots may be arrayed in a linear array over a length of each receiving rack and open towards the front plane of the base frame. A plurality of magazine apparatuses may be housed in a cassette.

Additional features and advantages of the apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1A schematically depicts a front view of a magazine apparatus, according to one or more embodiments shown and described herein;

FIG. 7 schematically depicts a perspective view of a of a magazine apparatus removably coupled to a support frame, according to one or more embodiments shown and described herein;

FIG. 8 schematically depicts a side view of a magazine apparatus, according to one or more embodiments shown and described herein;

DETAILED DESCRIPTION

Figure 1B:
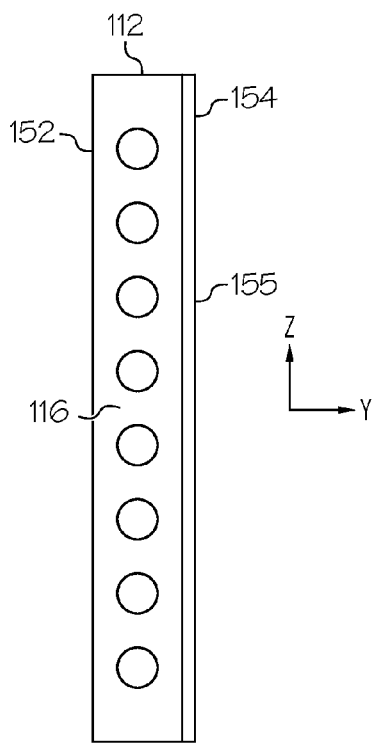
FIG. 1B schematically depicts a side view of a magazine apparatus, according to one or more embodiments shown and described herein.

Reference will now be made in detail to embodiments of magazine apparatuses for holding and retaining glass articles during processing, examples of which are illustrated in the accompanying drawings. Whenever possible, the same reference numerals will be used throughout the drawings to refer to the same or like parts. One embodiment of an apparatus for holding and retaining glass articles during processing is schematically depicted in FIG. 1A. The magazine apparatus generally comprises a base frame, a back plate, and a plurality of receiving racks. Each receiving rack may be parallel to and spaced apart from adjacent receiving racks in a vertical direction and comprise a plurality of receiving slots for receiving at least a portion of a glass article. The magazine apparatus may further comprise at least one loading stop and/or loading grid removably coupled to the base frame. In another embodiment, an assembly for holding and retaining glass articles may comprise a plurality of magazine apparatus. Various embodiments of apparatuses for holding and retaining glass articles during processing will be described in further detail herein with specific reference to the appended drawings.

As noted herein, the breakage of glass articles during processing and/or filling is a source of product loss and may lead to process inefficiencies and increased costs. Additionally, cosmetic flaws in glass articles are often undesirable to users. Strengthening of glass articles can assist in mitigating breakage and scratching. Glass articles can be strengthened using a variety of techniques, including chemical and thermal tempering. For example, chemical tempering, sometimes called ion-exchange strengthening, can be used to strengthen glass articles through the introduction of a layer of compressive stress in the surface of the glass articles. The compressive stress is introduced by submerging the glass articles in a molten salt bath, sometimes referred to as an ion-exchange bath. As ions from the glass are replaced by relatively larger ions from the molten salt, a compressive stress is induced in the surface of the glass. During chemical tempering, glass articles, such as glass containers, may be mechanically manipulated to both fill and empty the glass articles of molten salt.

While chemical tempering improves the strength of the glass articles, mechanical manipulation of the glass articles during the strengthening process may introduce flaws in the surface of the glass. For example, contact between the glass articles and the fixturing, such as a magazine apparatus, used to retain the glass articles during processing may introduce flaws in the glass, particularly when the glass articles and the fixturing are initially submerged in the molten salt bath and/or when the fixturing and glass articles are withdrawn from the molten salt bath and rotated to empty the glass articles of molten salt. Specifically, as the glass articles are submerged they may be buoyant and thus be propelled upward relative to the fixturing. Moreover, after the ion-exchange process is complete, the fixturing and glass articles are withdrawn from the molten salt bath and the fixturing is rotated to empty the glass articles of molten salt contained within the interior volume of the glass articles. As the fixturing is rotated, the glass articles may abruptly collide with the fixturing. This blunt force impact between the glass articles and the fixturing may introduce flaws in the surface of the glass.

In most cases the flaws are superficial and are contained within the layer of surface compressive stress induced in the glass. This surface compressive stress prevents the flaws from growing into cracks. However, in extreme cases, the flaws may extend through the layer of surface compressive stress which may lead to breakage of the glass articles.

The magazine apparatuses for holding and retaining glass articles during processing described herein generally mitigate the introduction of flaws in the glass articles retained therein and limit the introduction of flaws to locations of the glass article which are more susceptible to breakage. The magazine apparatuses described herein also have a relatively low thermal mass and surface area which mitigate the degradation of ion exchange performance when the magazine apparatuses are used to facilitate strengthening of the glass articles contained therein by ion exchange.

Figure 2:
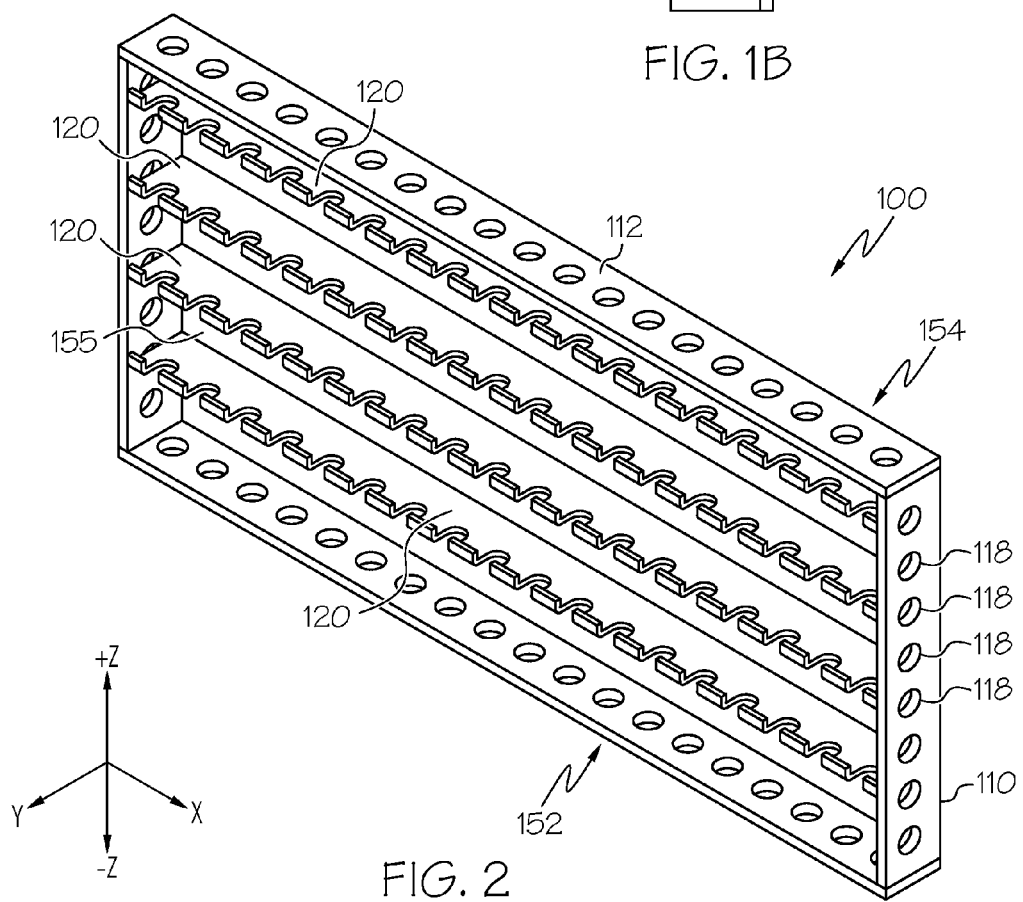
FIG. 2 schematically depicts a perspective view of a magazine apparatus, according to one or more embodiments shown and described herein.

Referring now to FIGS. 1A, 1B, and 2, one embodiment of a magazine apparatus 100 for holding and retaining glass articles 900 during processing is schematically depicted. The magazine apparatus 100 generally includes a base frame 110 which generally defines a front plane 152 and a back plane 154. The front plane 152 and back plane 154 are defined by the base frame 110 and are substantially parallel with one another, having a distance apart from one another in the Y-axis direction. The magazine apparatus 100 generally exists between the front plane 152 and the back plane 154. In the embodiment depicted in FIGS. 1A, 1B, and 2, the base frame 110 is generally rectangular and includes a top support 112, a bottom support 114 which are connected together via at least one pair of opposed lateral side supports 116. In embodiments, each of the portions of the base frame 110 (i.e., the top support 112, bottom support 114, and side supports 116) may be discrete parts assembled together to form a unitary body, such as by welding and/or with mechanical fasteners. Alternatively, the base frame 110 may be formed from a single strap of material which is shaped (e.g., through bending or the like) into the base frame 110. In this embodiment, the free ends of the single strap of material may be welded together to form a closed frame after shaping. While the embodiment of the base frame 110 depicted in FIGS. 1A, 1B and 2 is rectangular, it should be understood that other shapes are contemplated and possible including, without limitation, rectangles, circles, hexagons, other polygons, and the like. As shown in FIG. 2, the base frame 110 may comprise apertures 118 which allow for processing fluids, such as the molten salt of an ion exchange bath, to pass from the outside of the base frame 110 to the inside of the base frame 110 when the magazine apparatus 100 is submerged. In other embodiments, the base frame 110 may have other geometric features besides apertures which serve to allow for the passage of liquids between the inside and outside of the base frame 110. The base frame 110 is generally formed from a material capable of withstanding elevated temperatures, such as the temperatures experienced in a molten salt bath during an ion exchange process. In the embodiments described herein, the base frame 110 is formed from a metallic material such as, for example, 300 series stainless steel (304 stainless, 316 stainless, 316L stainless), nickel, or nickel-based alloys.

In embodiments, the base frame 110 is constructed to minimize its thermal mass. For example, in embodiments, the base frame 110 may be constructed from a thin strap (or straps) of material such that the base frame 110 has a thickness of less than or equal to 0.05 inch (1.27 mm) or even less than or equal to 0.03 inch (0.762 mm). In still other embodiments, the base frame 110 may be constructed from a thin strap (or straps) of material such that the base frame 110 has a thickness of less than or equal to 0.02 inch (0.508 mm) or even less than or equal to 0.015 inch (0.381 mm). Forming the base frame 110 from a thin strap (or straps) of material reduces the overall thermal mass of the magazine apparatus 100 while providing structural rigidity to the magazine apparatus 100.

In one embodiment, the magazine apparatus 100 further comprises a back plate 155 that is positioned in the back plane 154. The back plate 155 may be a sheet of material (rectangular shaped in the embodiment shown in FIG. 1A) that is contoured to the shaped formed from the base frame 110. For example, the back plate 155 may be directly connected with each of the top support 112, bottom support 114, and side supports 116. The back plate 155 may comprise a plurality of apertures (not shown in FIG. 1A) which allow for free flow of a processing fluid through the back plate 155 when the magazine apparatus 100 is submerged. In one embodiment, the back plate 155 is a metal sheet with machined apertures of at least about 1 cm in diameter.

Still referring to FIGS. 1A, 1B, and 2, the magazine apparatus 100 further comprises a plurality of receiving racks 120 which hold glass articles 900. The receiving racks 120 are supported in the base frame 110 between the front plane 152 and the back plane 154. For example, in embodiments, the receiving racks 120 may be supported and secured by attachment with the side supports 116 of the base frame 110 and may have a length as measured between the two side supports 116 (shown as the X-axis in FIGS. 1A, 1B, and 2). For example, in some embodiments the ends of each receiving rack 120 are formed with tabs 156 (depicted in FIGS. 4 and 5) which engage with corresponding slots (not shown) in the side supports 116. In embodiments, the tabs 156 may be secured in the side supports 116 by welding, mechanical fasteners or the like. Alternatively, the tabs 156 may be secured in the side supports 116 with an interference fit. In the embodiments shown and described herein, each receiving rack 120 is parallel to and spaced apart from adjacent receiving racks in a vertical direction (i.e., the +/−Z direction of the coordinate axes depicted in FIG. 2).

Each receiving rack 120 is constructed to retain a plurality of glass articles 900 which are suspended from the receiving racks 120. For example, in the embodiments of the magazine apparatus 100 described herein, each receiving rack 120 comprises a plurality of receiving slots 130 for receiving at least a portion of a glass article 900. The receiving slots 130 are arranged in a linear array over the length of each receiving rack 120. In the embodiments described herein, the receiving slots 130 are oriented to open towards the front plane 152 of the base frame 110. In one embodiment, each receiving slot 130 is suitably sized and shaped to hold one glass article 900 in the neck region 904 of the glass article 900. As such, it should be understood that each receiving rack 120 holds a row of glass articles 900 suspended therefrom. The receiving racks 120 may be in contact with the back plate 155 on the side opposite the receiving slots 130.

As noted above, the receiving racks 120 may be arranged in a vertical configuration (i.e., vertically stacked) relative to one another. In such a configuration, the length (in the X-direction) and the width (in the Y-direction) of each glass article 900 may be aligned with vertically glass articles 900 housed in adjacent receiving racks 120. As such, the receiving racks 120 are stacked on top of one another with a space between each receiving rack 120 sufficient to accommodate a row of glass articles 900 suspended from the receiving rack 120 positioned above. As such, it should be understood that the glass articles 900 generally hang from respective receiving racks 120 and occupy a portion of the space immediately below each receiving rack 120.

In embodiments, the relative position and orientation of the receiving racks 120 facilitate the arrangement of glass articles 900 in rows and columns. For example, as shown in FIG. 1A, the magazine apparatus 100 may comprise four receiving racks 120, where the number of receiving racks 120 defines the number of rows (equal to the column height) of glass articles 900 in the arrangement. While FIGS. 1A, 1B, and 2 depict four rows of receiving racks 120, it should be understood that the magazine apparatus 100 may comprise more or fewer receiving racks 120. For example, in other embodiments, the magazine apparatus 100 may comprise, without limitation, more or less than four receiving racks 120, such as 2, 3, 5, 6, 7, 8, 9, 10, 12, or even 20 receiving racks 120, or a range between any of these disclosed values. Further, while the embodiments of the magazine apparatus 100 shown in FIGS. 1A, 1B, and 2 depict each receiving rack 120 as comprising 18 receiving slots 130 per receiving rack 120, it should be understood that each receiving rack 120 may include more or fewer receiving slots 130. For example, in other embodiments, each receiving rack 120 may include more or less than 18 receiving slots 130, such as between about 1 and about 200 receiving slots 130, such as 2, 3, 4, 5, 6, 7, 8, 9, 10, 11, 12, 13, 14, 15, 16, 17, 18, 19, 20, 21, 22, 23, 24, 26, 28, 30, 40, 50, 75, 100, 125, 150, 175, or 200 receiving slots 130, or a range between any of these disclosed values. Accordingly, it should be understood that the number of receiving slots 130 generally defines the length of the receiving rack 120.

Figure 3:
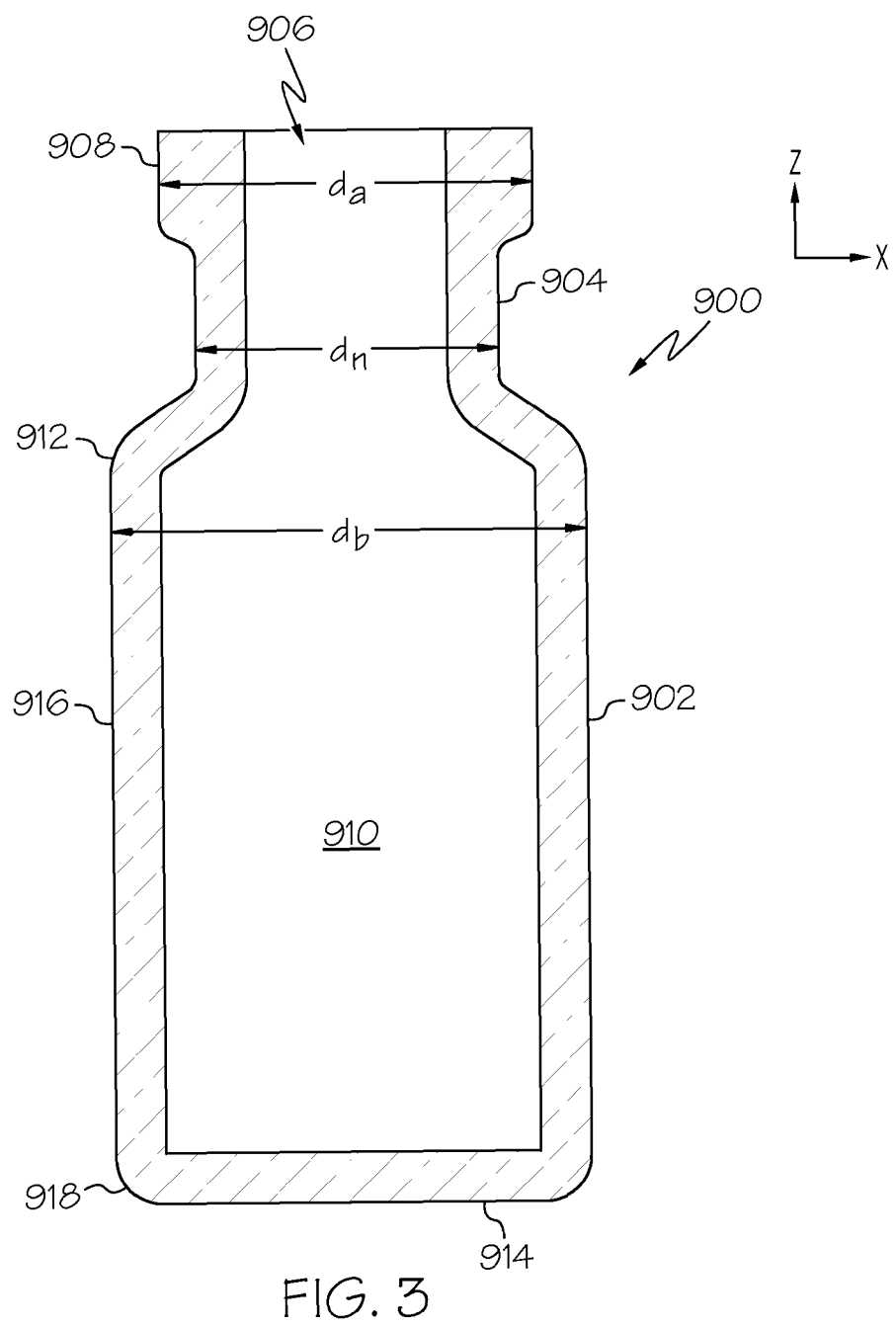
FIG. 3 schematically depicts a cross-sectional view of a glass article, according to one or more embodiments shown and described herein.

In the embodiments described herein, each receiving slot 130 may be shaped and sized to securely hold glass articles 900 having a particular form factor, such as round, rectangular or the like. For example, in one embodiment the receiving slots 130 of the receiving rack 120 may be shaped to retain round-form glass vials. An example of a glass article 900 in the form of a glass vial is schematically depicted in FIG. 3. In this embodiment, the glass article 900 in the shape of a glass vial may generally include a body section 902, a neck section 904 above the body section 902, and an opening 906 leading through the neck and connected to the interior volume 910. The body section 902 substantially surrounds the interior volume 910 of the glass article 900 with a bottom section 914 and side walls 916. The neck section 904 generally connects the body section 902 with the opening 906. The opening 906 may be surrounded by a collar 908 extending outward from the top of the neck region 904 of the glass article 900. The body section 902 may have a curved bottom edge 918 and a curved area 912 adjacent the neck section 904. Generally, the neck section 904, body section 902, and collar 908 may have a generally circular shaped cross section, each comprising an exterior diameter. In one embodiment, the diameter of the collar ($d_a$ in FIG. 3) is greater than the diameter of the neck section ($d_n$ in FIG. 3) and the diameter of the body section ($d_b$ in FIG. 3) is greater than the diameter of the collar. The neck section 904 and collar 908 may generally be formed with a greater thickness than the balance of the glass article 900 and, as such, may be better able to withstand incidental damage, such as scuffing, scratching or the like, without breakage than the balance of the glass article 900. Accordingly, the receiving racks 120 and receiving slots 130 of the magazine apparatus 100 are constructed to engage with the glass article 900 in the neck section 904 and collar 908.

Figure 4:
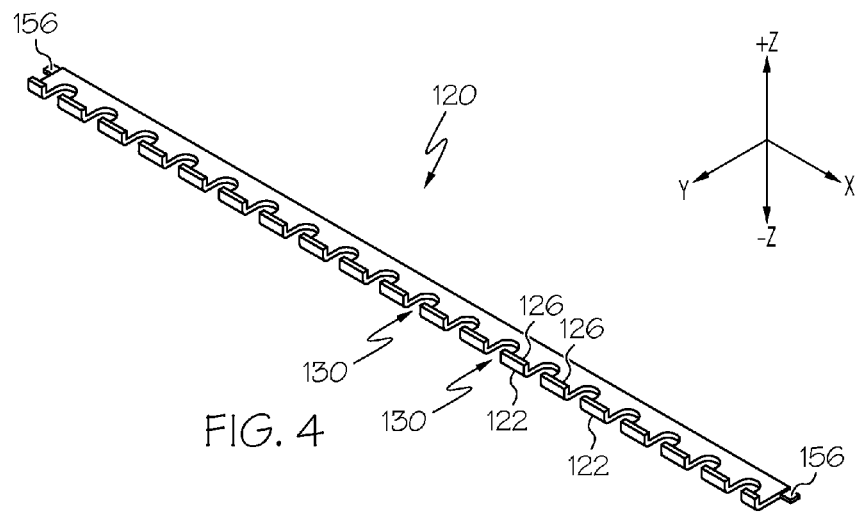
FIG. 4 schematically depicts a perspective view of a receiving rack of a magazine apparatus, according to one or more embodiments shown and described herein.
Figure 5:
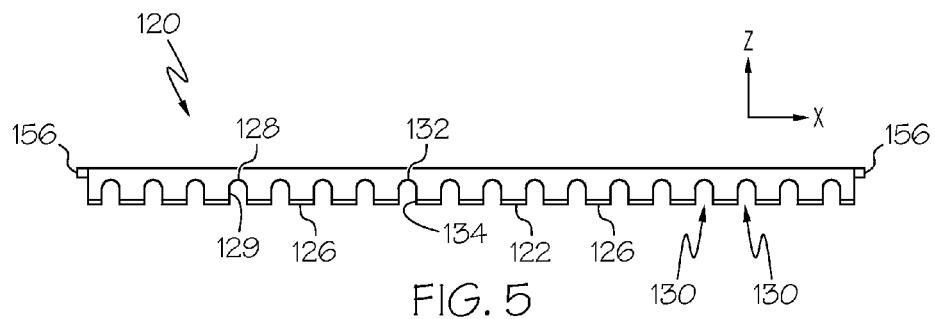
FIG. 5 schematically depicts a top view of a receiving rack of a magazine apparatus, according to one or more embodiments shown and described herein.
Figure 6:
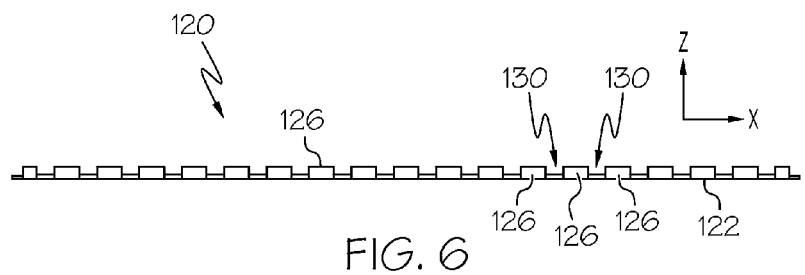
FIG. 6 schematically depicts a side view of a receiving rack of a magazine apparatus, according to one or more embodiments shown and described herein.

Now referring to FIGS. 4-6, several views of a receiving rack 120 are depicted. The receiving racks 120 may generally be formed from a material capable of withstanding elevated temperatures, such as the temperatures experienced in a molten salt bath during an ion exchange process. In the embodiments described herein, the receiving racks 120 may be formed from a metallic material such as, for example, 300 series stainless steel (304 stainless, 316 stainless, 316L stainless), nickel, or nickel-based alloys. In the embodiments described herein, the receiving racks 120 may be formed from generally rectangular strap of sheet material with a relatively thin thickness in the z-axis direction to reduce the thermal mass of the magazine apparatus 100. For example, in embodiments, the receiving racks 120 have a thickness of less than or equal to 0.05 inch (1.27 mm) or even less than or equal to 0.03 inch (0.762 mm). In still other embodiments, the receiving racks 120 may have a thickness of less than or equal to 0.02 inch (0.508 mm) or even less than or equal to 0.015 inch (0.381 mm). Forming the receiving racks 120 from material with a relatively thin thickness reduces the overall thermal mass of the magazine apparatus 100 while providing structural rigidity to the magazine apparatus 100.

Still referring to FIGS. 4-6, the receiving slots 130 of each receiving rack 120 are sized to receive at least a portion of a glass article 900. For example, in embodiments, the receiving slots 130 are sized such that the receiving rack 120 contacts at least a portion of the neck section 904 or collar 908 of a glass article 900 such that the glass article 900 is suspended by the protruded collar 908 of the glass article 900. As such, the collar 908 is positioned above the receiving rack 120 and the neck section 904 is positioned within the receiving slot 130 of the receiving rack 120 in which it is suspended. For example, as noted herein, the diameter of the collar ($d_a$) is greater than the diameter of the neck section ($d_n$) and the widths (i.e., the dimension of the receiving slots 130 in the x-direction of the coordinate axes depicted in FIGS. 4-6) of the receiving slots 130 are slightly greater than the diameter of the neck section and smaller than the diameter of the collar of the glass article 900. Thus, the glass article 900 can hang by the collar 908 and is only contacted by the magazine apparatus 100 at the neck section 904 and the collar 908.

The arrangement described herein is favorable because the neck section 904 is generally more robust and less sensitive to flaws and may not be as cosmetically critical. Generally, during processing, flaws may not be introduced onto the glass articles 900. However, in some the embodiments described herein, if a flaw is introduced in the glass article 900 by contact with the magazine apparatus 100, it is at or near the neck section 904 because the glass articles 900 are only contacted by the magazine apparatus 100 at the neck section 904 and collar 908. Flaws introduced during processing may not lead to glass damage which lead to breakage as compared to flaws formed elsewhere on the glass article 900.

As shown in FIGS. 4-6, the receiving slots 130 may open through the side 122 of the receiving rack 120. In embodiments, the closed ends of the receiving slots 130 may be shaped to correspond to the shape the glass articles 900 to be positioned in the receiving slots 130. For example, when the receiving racks 120 are constructed to receive and hold round-form glass articles, such as the glass vials described herein, the closed ends of the receiving slots 130 may be semi-circular to correspond to the contours of the neck section 904 of the glass article 900. Between each semi-circular section 128 may be an elongated section 129 of the receiving slot 130 that connects the semi-circular section 128 with the side 122 of the receiving rack 120, generally defining the length of the receiving slot 130. In embodiments, the widths of the receiving slots 130 in the area 134 adjacent the side 122 of the receiving rack 120 may be slightly larger than the diameter of the neck section 904 of the glass article 900 and the semi-circular shaped area 132 may be slightly larger than the circular cross-section of the neck section 904.

While FIGS. 4-6 depict the receiving slots 130 as having semi-circular closed ends, it should be understood that other shapes and configurations are possible. For example, in embodiments where the glass articles 900 to be received and held in the magazine apparatus 100 are square-form glass articles, the closed ends of the receiving slots 130 may be square or rectangular to match the shape of the glass article to be retained therein. Forming the closed ends of the receiving slots 130 to match the shape of the glass article reduces point contacts between the glass article 900 and the receiving racks 120, reducing or mitigating the introduction of flaws.

Still referring to FIGS. 2 and 4-6, in embodiments, the receiving racks 120 may further comprise retention lips 126 positioned proximate the front plane 152. For example, in embodiments, the retention lips 126 extend from the receiving rack 120 in a generally vertical direction (i.e., the direction of the +Z direction of the coordinate axes shown in FIGS. 4-6) on either side of each receiving slot 130. The retention lips 126 assist in retaining glass articles 900 in the receiving slots 130 and prevent the glass articles 900 from sliding out the receiving slots 130 when the magazine apparatus 100 is manipulated during processing of the glass articles 900. The retention lips 126 may also assist in retaining glass articles 900 in the receiving slots 130 when the glass articles 900 are positively buoyant, such as when the magazine apparatus 100 is submerged in an ion exchange bath of molten salt. In embodiments, the retention lips 126 may be a segment of the receiving rack 120 that is bent upward. Alternatively, the retention lips 126 may be formed from a separate piece of material which is joined to the top surface of the receiving rack 120, such as by welding, brazing or the like. In embodiments, the retention lips 126 are shorter than the height of the neck section 904 so that the glass articles 900 can be easily inserted and removed in the receiving slots 130 with an upward motion followed by a lateral motion. As such, insertion and removal of a glass article 900 may be accomplished by a lateral movement into or out of a receiving slot 130 while the collar 908 is positioned above the retention lip 126 and an upward or downward motion to disengage or engage the receiving rack 120 with the collar 908 of the glass article 900.

In the embodiments described herein, the base frame 110 and/or the receiving racks 120 may be electro-polished to deburr the sharp edges that may be created during manufacture. Electro-polishing may also increase the surface finish which aids in the draining or sheeting of liquids from the magazine apparatus 100. In some embodiments, the base frame 110 and/or the receiving racks 120 may be passivated following electro-polishing. Passivation may further increase the passive layer of the stainless steel which, in turn, increases the corrosion resistance of the magazine.

Now referring to FIG. 7, an embodiment of a magazine apparatus 100 is depicted in which the base frame 110 is removably coupled to a support frame 200. The support frame 200 generally comprises an upright portion 202 coupled to a support portion 204. In embodiments, the upright portion 202 is substantially vertically oriented (i.e., the upright portion 202 is substantially parallel with the +/−Z-direction of the coordinate axes depicted in FIG. 7. The support portion 204 is generally oriented at an angle to the upright portion 202 such that the support portion 204 is declined with respect to the upright portion 202. The support portion 204 is generally planar and includes a plurality of corner brackets 206 situated at the corners. The corner brackets 206 are oriented to releasably receive and engage with the base frame 110 such that the base frame 110 is removably coupled to support portion 204 of the support frame 200. The declined orientation of the support portion 204 facilitates insertion of the glass articles 900 into the magazine apparatus 100. However, it should be understood that the glass articles 900 may be inserted into the magazine apparatus 100 while the magazine apparatus 100 is in a completely upright position.

In embodiments, the magazine apparatus 100 may further comprise one or more removable features which facilitate orienting and protecting the glass articles 900 during loading of the magazine apparatus 100. For example, in one embodiment, the magazine apparatus 100 further includes at least one loading stop 350. Referring to FIGS. 1A and 7, in embodiments, the magazine apparatus 100 may include a plurality of loading stops 350. The loading stops 350 are removably coupled to the base frame 110 proximate the back plane 154 of the base frame 110. The loading stops 350 prevent glass articles 900 suspended from the receiving racks 120 from rotating through the back plane 154 as the magazine apparatus 100 is manipulated, such as rotated, during initial loading. In embodiments, the loading stops 350 may be formed from a strap of plastic material such as, for example, a polyoxymethylene such as Delrin or other like materials. In embodiments, the loading stops 350 slide into the base frame 110 of the magazine apparatus 100 adjacent to the back plate 155 such that the loading stops 350 are positioned between the glass articles 900 and the back plate 155 when the glass articles 900 are held in the receiving racks 120. The loading stops 350 prevent the glass articles 900 suspended from the receiving racks 120 from rotating into contact with the back plate 155 and thereby shield the glass articles 900 from contact with the metallic material of the back plate 155. As shown in FIG. 8, the loading stops 350 may slide into stop guides 352 extending through the thickness of the side supports 116 of the base frame 110. The loading stops 350 are positioned in the base frame 110 during loading and are removed from the base frame 110 prior to the base frame 110 being submerged in the molten salt of an ion-exchange bath.

In addition to or as an alternative to the loading stops 350, the magazine apparatus 100 may also include a loading grid 310. The loading grid 310 includes an array of ware receiving spaces 312 separated by partitions 314. The loading grid 310 is removably positioned in the base frame 110 so that each receiving slot 130 of the receiving rack 120 is positioned in a ware receiving space 312 of the loading grid 310. The loading grid 310 may be formed from a plastic material. When installed in the base frame 110, the loading grid 310 may prevent contact between glass articles 900 suspended from the receiving racks 120 of the same magazine apparatus 100. In some embodiments, the back of the loading grid 310 is open such that the ware receiving spaces 312 extend through the loading grid 310 unimpeded. In some embodiments, the back of the loading grid 310 may be contoured to the shape of the receiving racks 120 so that the loading grid 310 fits into the magazine apparatus 100. The loading grid 310 may be formed from a plastic material, similar to or the same as the loading stops 350. It should be understood that, while the loading stops 350 and loading grid 310 are shown together in FIG. 7, the loading stops 350 and the loading grid 310 may be used independently of one another.

Referring again to FIG. 1A, in another embodiment, the distance between the rows of the glass articles 900 is selected such that there is adequate distance between glass articles 900 to facilitate evacuating and filling the glass articles 900 as the magazine apparatus 100 is submerged in a processing fluid, such as a molten salt bath. When the glass articles 900 are submerged into a liquid with the opening facing up, they have a positive buoyancy and float up such that the body section 902 of the glass article 900 comes into contact with the bottom of the receiving rack 120 from which it is suspended. However, the glass article 900 directly above a glass article 900 being submerged is not yet experiencing the positive buoyancy (i.e., the glass article directly above is not floating). Therefore, the space between the receiving racks 120 should be sufficient to prevent the glass articles 900 below from colliding with the glass articles 900 above as the magazine apparatus 100 is submerged. For example, in some embodiments, the distance between the top of the glass article 900 when floating must be at least about 8-10 mm from the bottom of the glass article 900 above it to not only ensure proper filling, but also to prevent contact between glass articles 900.

Figure 9:
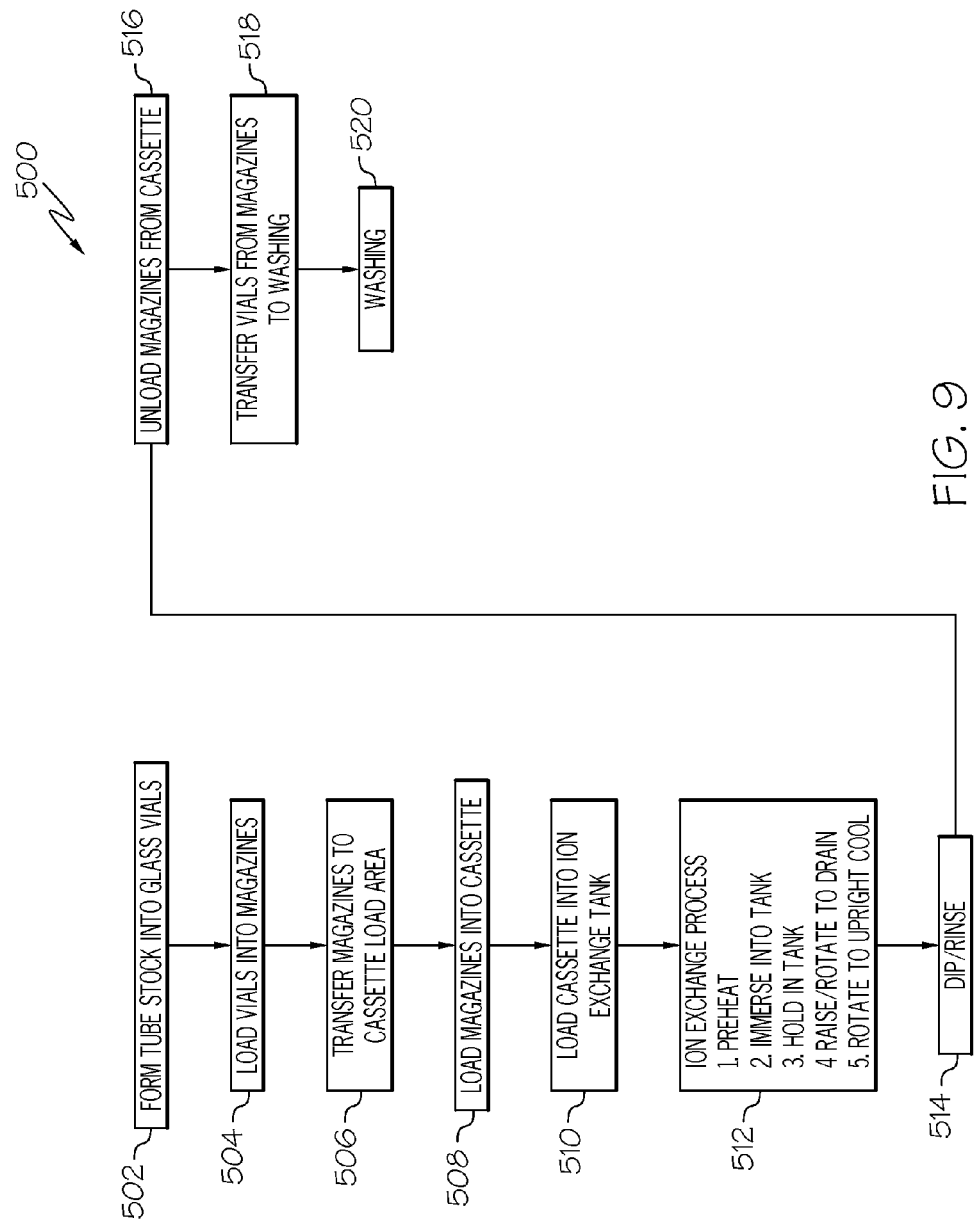
FIG. 9 is a flow diagram of a method for ion-exchange strengthening glass articles with magazine apparatuses, according to one or more embodiments shown and described herein.
Figure 10:
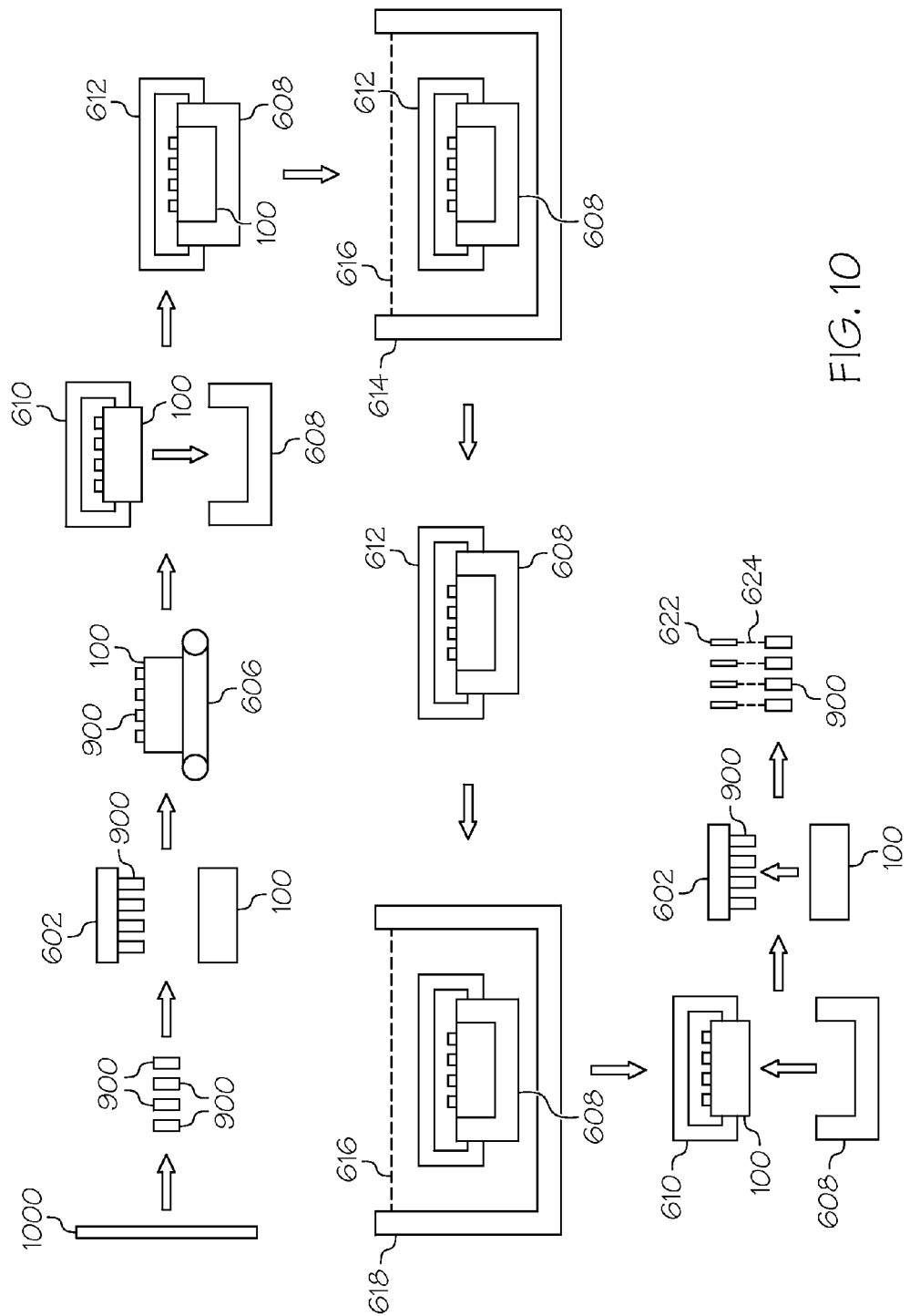
FIG. 10 schematically depicts the method steps of the flow diagram of FIG. 9, according to one or more embodiments shown and described herein.

Now referring collectively to FIGS. 1A, 1B, 2, 9, and 10, the glass articles 900 can be strengthened by ion-exchange processing while being held in the receiving slots 130 of magazine apparatuses 100. FIG. 9 contains a process flow diagram 500 of a method for strengthening glass articles 900 by ion-exchange and FIG. 10 schematically depicts the process described in the flow diagram. It should be understood that FIG. 10 is only a schematic diagram, and some of the steps shown in FIG. 10 may utilize different positioning and geometry of the system parts. In a first step 502, glass tube stock 1000 formed from an ion-exchangeable glass composition is initially shaped into glass articles 900 (specifically glass vials in the embodiment depicted) using conventional shaping and forming techniques. In step 504, the glass articles 900 are loaded into magazine apparatuses 100 using a mechanical magazine loader 602. The magazine loader 602 may be a mechanical gripping device, such as a caliper or the like, which is capable of gripping multiple glass articles 900 at one time. As described herein, during loading, the magazine apparatus 100 may comprise one or more removable features, such as loading stops 350 or a loading grid 310, which may inhibit contact between the glass articles 900 and the back plate 155 and between adjacent glass articles 900. Alternatively, the gripping device may utilize a vacuum system to grip the glass articles 900. The magazine loader 602 may be coupled to a robotic arm or other, similar device capable of positioning the magazine loader 602 with respect to the glass articles 900 and the magazine apparatus 100. The magazine loader 602 positions individual glass articles 900 into the receiving slots 130 of each receiving rack 120 such that each glass article 900 has its opening facing upward.

In a next step 506, the magazine apparatus 100 loaded with glass articles 900 is transferred with a mechanical conveyor, such as a conveyor belt 606, overhead crane or the like, to a cassette loading area. Thereafter, in step 508, at least one magazine apparatus 100 is loaded into a cassette 608. While only one magazine apparatus 100 is depicted in FIG. 12, it should be understood that the cassette 608 is constructed to hold a plurality of magazine apparatuses 100 such that a large number of glass articles 900 can be processed simultaneously. Each magazine apparatus 100 is positioned in the cassette 608 utilizing a cassette loader 610. The cassette loader 610 may be a mechanical gripping device, such as a caliper or the like, which is capable of gripping one or more magazine apparatuses 100 at a time. Alternatively, the gripping device may utilize a vacuum system to grip the magazine apparatuses 100. The cassette loader 610 may be coupled to a robotic arm or other, similar device capable of positioning the cassette loader 610 with respect to the cassette 608 and the magazine apparatuses 100.

Figure 11:
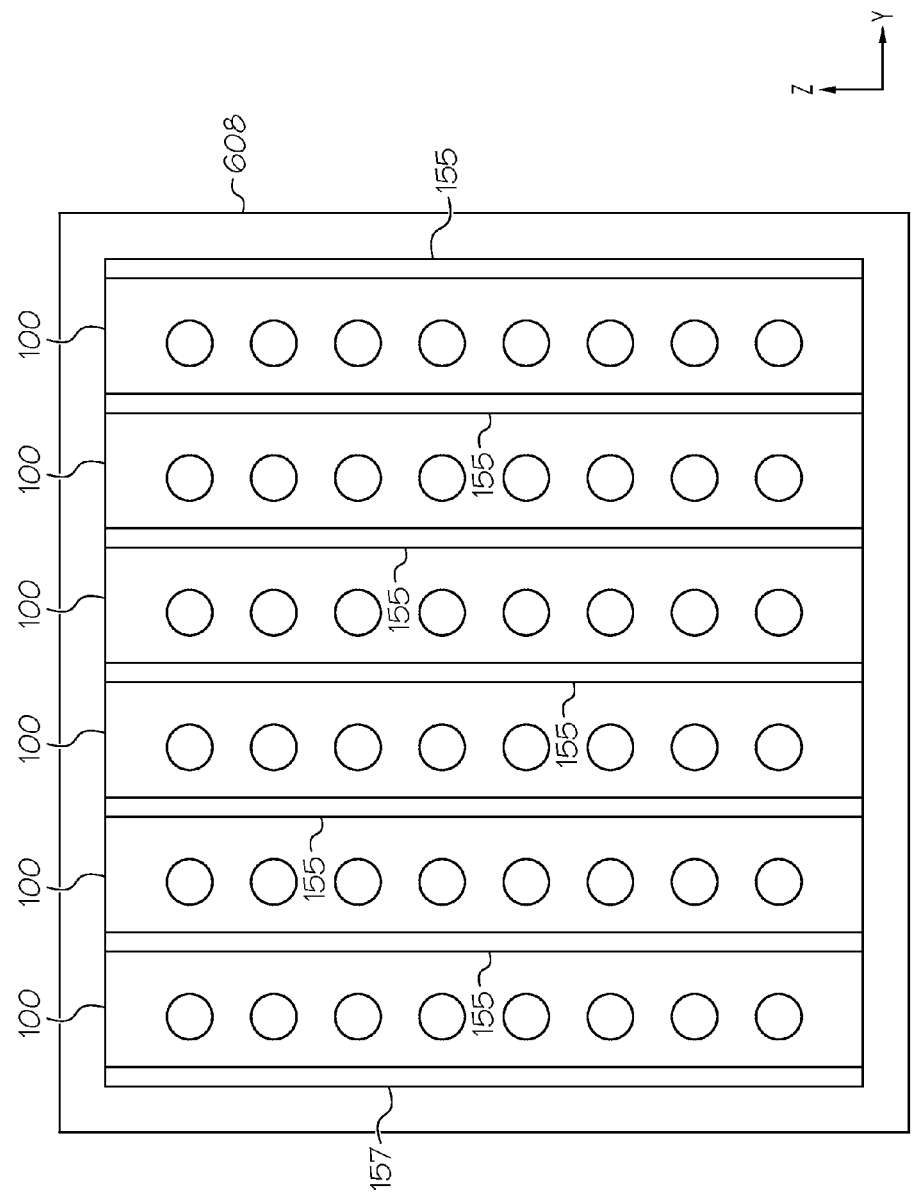
FIG. 11 schematically depicts a plurality of magazine apparatuses vertically positioned in a cassette, according to one or more embodiments shown and described herein.

Referring now to FIG. 11 multiple magazine apparatuses 100 may be loaded into a cassette 608 in a "bookshelf" configuration. In such a configuration, the magazine apparatuses 100 are positioned side by side and each glass article 900 has its opening facing upward. The cassette 608 may be any mechanically secure framework or attachment means to hold the multiple magazine apparatuses 100 together in their depicted arrangement. The cassette 608 is substantially open to fluid flow such that it does not inhibit processing fluids from contacting the housed magazine apparatuses 100 when submerged. In one embodiment, the magazine apparatus 100 are arranged so that each of their respective back plates 155 is on the same side (the right side in FIG. 11). In such a configuration, the back plate 155 of a magazine apparatus 100 is positioned in the front plane 152 of the neighboring magazine apparatus 100. The magazine apparatus 100 without a neighboring back plate 155 situated at its front plane 152 is fitted with a cover plate 157 that is positioned within the space of its front plane 152. The cover plate 157 may removably engage with a magazine apparatus 100. The cover plate 157 may be similar in design to the back plate 155 and be formed as a sheet comprising apertures.

Referring again to FIGS. 9 and 10, in a next step 510, the cassette 608 containing the magazine apparatuses 100 and glass articles 900 is transferred to an ion-exchange station and loaded into an ion-exchange tank 614 to facilitate chemically strengthening the glass articles 900. The cassette 608 is transferred to the ion-exchange station with a cassette transfer device 612. The cassette transfer device 612 may be a mechanical gripping device, such as a caliper or the like, which is capable of gripping the cassette 608. Alternatively, the gripping device may utilize a vacuum system to grip the cassette 608. The cassette transfer device 612 and attached cassette 608 may be automatically conveyed from the cassette loading area to the ion-exchange station with an overhead rail system, such as a gantry crane or the like. Alternatively, the cassette transfer device 612 and attached cassette 608 may be conveyed from the cassette loading area to the ion-exchange station with a robotic arm. In yet another embodiment, the cassette transfer device 612 and attached cassette 608 may be conveyed from the cassette loading area to the ion-exchange station with a conveyor and, thereafter, transferred from the conveyor to the ion-exchange tank 614 with a robotic arm or an overhead crane.

It should be understood that prior to ion-exchange processing, the removable features (i.e., the loading grid 310 and/or the loading stops 350) are removed. They may be removed prior to the assembly of the loading of the magazine apparatuses 100 into the cassette 608. In another embodiment, the loading stops 350 may be removed following the insertion of the magazine apparatuses 100 into the cassette 608, where the loading stops 350 are exposed through the cassette 608.

Once the cassette transfer device 612 and attached cassette 608 are at the ion-exchange station, the cassette 608 and the glass articles 900 contained therein may optionally be preheated prior to submerging the cassette 608 and the glass articles 900 in the ion-exchange tank 614. In some embodiments, the cassette 608 may be preheated to a temperature greater than room temperature and less than or equal to the temperature of the molten salt bath in the ion-exchange tank 614. For example, the glass articles 900 may be preheated to a temperature from about 300° C.-500° C. However, it should be understood that the preheating step is optional due to the relatively low thermal mass of the magazine apparatuses 100 described herein.

The ion-exchange tank 614 contains a bath of molten salt 616, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion-exchange of the glass articles 900.

In step 512, the glass articles 900 are ion-exchange strengthened in the ion-exchange tank 614. Specifically, the glass articles 900 are submerged in the molten salt and held there for a period of time sufficient to achieve the desired compressive stress and depth of layer in the glass articles 900. As the glass articles 900 are submerged, the glass articles 900 initially have positive buoyancy as air escapes from the interior volume of the glass articles 900 and is replaced with molten salt. As the glass articles 900 rise due to the positive buoyancy, the glass articles 900 are vertically retained in position.

In one embodiment, the glass articles 900 may be held in the ion-exchange tank 614 for a time period sufficient to achieve a depth of layer of up to about 100 µm with a compressive stress of at least about 300 MPa or even 350 MPa. The holding period may be less than 30 hours or even less than 20 hours. However it should be understood that the time period with which the glass articles are held in the tank 614 may vary depending on the composition of the glass container, the composition of the bath of molten salt 616, the temperature of the bath of molten salt 616, and the desired depth of layer and the desired compressive stress.

After the glass articles 900 are ion-exchange strengthened, the cassette 608 and glass articles 900 are removed from the ion-exchange tank 614 using the cassette transfer device 612 in conjunction with a robotic arm or overhead crane. During removal from the ion-exchange tank 614, the molten salt within the magazine apparatus readily drains from each magazine apparatus 100. After the cassette 608 is removed from the ion-exchange tank 614, the cassette 608 and the glass articles 900 are suspended over the ion-exchange tank 614 and the cassette 608 is rotated about a horizontal axis such that any molten salt remaining in the glass articles 900 is emptied back into the ion-exchange tank 614. As the cassette 608 is rotated, the glass articles 900 are maintained in position. Thereafter, the cassette 608 is rotated back to its initial position and the glass articles 900 are allowed to cool prior to being rinsed.

The cassette 608 and glass articles 900 are then transferred to a rinse station with the cassette transfer device 612. This transfer may be performed with a robotic arm or overhead crane, as described above, or alternatively, with an automatic conveyor such as a conveyor belt or the like. In a next step 514, the cassette 608 and glass articles 900 are lowered into a rinse tank 618 containing a water bath 620 to remove any excess salt from the surfaces of the glass articles 900. The cassette 608 and glass articles 900 may be lowered into the rinse tank 618 with a robotic arm, overhead crane or similar device which couples to the cassette transfer device 612. Similar to the salt bath submersion, the glass articles 900 initially have a positive buoyancy upon being submerged in the rinse tank 618. As the glass articles 900 rise due to the positive buoyancy, the glass articles 900 are vertically retained in position. The cassette 608 and glass articles 900 are then withdrawn from the rinse tank 618, suspended over the rinse tank 618, and the cassette 608 is rotated about a horizontal axis such that any rinse water remaining in the glass articles 900 is emptied back into the rinse tank 618. As the cassette 608 is rotated, the glass articles 900 are maintained in position. In some embodiments, the rinsing operation may be performed multiple times before the cassette 608 and glass articles 900 are moved to the next processing station.

In one particular embodiment, the cassette 608 and the glass articles 900 are dipped in a water bath at least twice. For example, the cassette 608 may be dipped in a first water bath and, subsequently, a second, different water bath to ensure that all residual alkali salts are removed from the surface of the glass article 900. The water from the first water bath may be sent to waste water treatment or to an evaporator.

In a next step 516, the magazine apparatuses 100 are removed from the cassette 608 with the cassette loader 610. Thereafter, in step 518, the glass articles 900 are unloaded from the magazine apparatuses 100 with the magazine loader 602 and transferred to a washing station. In step 520, the glass articles are washed with a jet of de-ionized water 624 emitted from a nozzle 622. The jet of de-ionized water 624 may be mixed with compressed air.

Optionally, in step 521 (not depicted in FIG. 8), the glass articles 900 are transferred to an inspection station where the glass articles 900 are inspected for flaws, debris, discoloration and the like.

While the magazine apparatuses have been shown and described herein being used in conjunction with glass containers, such as glass vials, it should be understood that the magazine apparatuses may be used to hold and retain various other types of glass articles including, without limitation, Vacutainers®, cartridges, syringes, ampoules, bottles, flasks, phials, tubes, beakers, vials or the like, including both round-form glass articles and non-round-form glass articles.

It should now be understood that the magazine apparatuses described herein may be used to hold and retain glass articles during processing. The magazine apparatuses may mitigate the introduction of flaws in the glass articles retained therein and limit the introduction of flaws to locations of the glass article which are more susceptible to breakage. The design of the magazine apparatus also allows for sufficient contact between the glass articles and fluids, such as a salt bath, when the magazine apparatus is submerged. The magazine apparatuses described herein also have a relatively low thermal mass and surface area which mitigate the degradation of ion exchange performance.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A magazine apparatus for holding and retaining glass articles having neck and collar portions, the magazine apparatus comprising:
    a base frame defining a front plane and a back plane, the base frame comprising at least one pair of opposed lateral side support walls that extend between and are perpendicular to the front plane and the back plane, each side support wall comprising a stop guide in the form of a slot extending through the thickness of the corresponding side support wall;
    a back plate connected to the side support walls of the base frame and positioned in the back plane defined by the base frame;
    a plurality of receiving racks mounted in the base frame between the front plane and the back plane, each receiving rack being parallel to and spaced apart from adjacent receiving racks in a vertical direction, each receiving rack comprising a plurality of receiving slots for receiving at least a neck portion of a glass article, the receiving slots arrayed in a linear array over a length of each receiving rack and opening towards the front plane of the base frame, wherein protruding arms are defined by each side of a corresponding receiving slot and separate the respective receiving slots, wherein distal ends of the protruding arms are positioned proximate to the front plane;
    wherein the protruding arms are configured to receive collar portions of the corresponding glass articles extending beyond the neck portions to suspend the glass articles from the corresponding racks;
    at least one loading stop removably coupled to the base frame inserted within the at least one stop guide proximate the back plane, wherein the loading stop extends substantially across a width of the base frame; and the loading stop preventing glass articles suspended from the receiving racks from contacting the back plate as the magazine apparatus is manipulated thereby mitigating damage to the glass articles.

2. The magazine apparatus of claim 1, further comprising a loading grid comprising an array of ware receiving spaces separated by partitions of the loading grid, the loading grid being removably positioned in the base frame so that each receiving slot is positioned in a ware receiving space of the loading grid.

3. The magazine apparatus of claim 1, wherein an end of each receiving slot proximate the back plane is semi-circular.

4. The magazine apparatus of claim 1, wherein each protruding arm comprises a retention lip positioned proximate the front plane, the retention lip extending in an upward direction substantially perpendicular to the protruding arms of the receiving rack.

5. The magazine apparatus of claim 1, wherein at least the base frame and the plurality of receiving racks are formed from a metallic material that is passivated.

6. The magazine apparatus of claim 1, wherein at least the base frame and the plurality of receiving racks are formed from a metallic material that is electro-polished.

7. The magazine apparatus of claim 1, wherein the base frame is removably coupled to a support frame comprising an upright portion coupled to a support portion, wherein the support portion is declined with respect to the upright portion and the base frame removably coupled to the support portion of the support frame.

8. The magazine apparatus of claim 7, wherein the upright portion of the support frame comprises corner brackets and the base frame is engaged with the corner brackets.

9. A magazine apparatus for holding and retaining glass articles having neck and collar portions, the magazine apparatus comprising:
a base frame defining a front plane and a back plane, the base frame comprising at least one pair of opposed lateral side support walls that extend between and are perpendicular to the front plane and the back plane;
a back plate connected to the side support walls of the base frame and positioned in the back plane defined by the base frame;
a plurality of receiving racks mounted in the base frame between the front plane and the back plane, each receiving rack being parallel to and spaced apart from adjacent receiving racks in a vertical direction, each receiving rack comprising a plurality of receiving slots for receiving at least a neck portion of a glass article, the receiving slots arrayed in a linear array over a length of each receiving rack and opening towards the front plane of the base frame, wherein protruding arms are defined by each side of a corresponding receiving slot in order to separate the respective receiving slots, wherein distal ends of the protruding arms are positioned proximate to the front plane and the protruding arms are configured to receive collar portions of the corresponding glass articles extending beyond the neck portions to suspend the glass articles from the corresponding racks; and
a loading grid comprising an array of spaced vertically extending partitions; wherein the loading grid is sized corresponding to the back plate in order to insert the loading grid within the base frame between the side support walls parallel to the back plate, wherein glassware receiving spaces are defined between each vertical partition, each glassware receiving space is sized to receive respective glass articles that correspond to the slots of the receiving racks of the base frame, and the loading grid is removably positioned in the base frame so that each receiving slot is positioned in a glassware receiving space of the loading grid, the loading grid preventing contact between adjacent glass articles when the glass articles are positioned in the receiving slots of the plurality of receiving racks.

10. The magazine apparatus of claim 9, wherein an end of each receiving slot proximate the back plane is semi-circular.

11. The magazine apparatus of claim 9, wherein each protruding arm comprises an upwardly extending retention lip positioned proximate the front plane, the retention lip extending in an upward direction substantially perpendicular to the protruding arms of the receiving rack.

12. The magazine apparatus of claim 9, wherein at least the base frame and the plurality of receiving racks are formed from a metallic material that is passivated.

13. The magazine apparatus of claim 9, wherein at least the base frame and the plurality of receiving racks are formed from a metallic material that is electro-polished.

14. The magazine apparatus of claim 9, wherein the base frame is removably coupled to a support frame comprising an upright portion coupled to a support portion, wherein the support portion is declined with respect to the upright portion and the base frame removably coupled to the support portion of the support frame.

15. The magazine apparatus of claim 14, wherein the upright portion of the support frame comprises corner brackets and the base frame is engaged with the corner brackets.

16. An assembly for holding and retaining glass articles having neck and collar portions, the assembly comprising a plurality of magazine apparatuses, each of the magazine apparatuses comprising:
a base frame defining a front plane and a back plane, the base frame comprising at least one pair of opposed lateral side support walls that extend between and are perpendicular to the front plane and the back plane, each side support wall comprising a stop guide in the form of a slot extending through the thickness of the corresponding side support wall;
a back plate connected to the side support walls of the base frame and positioned in the back plane defined by the base frame;
a plurality of receiving racks mounted in the base frame between the front plane and the back plane, each receiving rack being parallel to and spaced apart from adjacent receiving racks in a vertical direction, each receiving rack comprising a plurality of receiving slots for receiving at least a neck portion of a glass article, the receiving slots arrayed in a linear array over a length of each receiving rack and opening towards the front plane of the base frame, wherein protruding arms are defined by each side of a corresponding receiving slot and separate the respective receiving slots, wherein distal ends of the protruding arms are positioned proximate to the front plane;
wherein the protruding arms are configured to receive collar portions of the corresponding glass articles extending beyond the neck portions to suspend the glass articles from the corresponding racks;
at least one loading stop removably coupled to the base frame and inserted within the at least one stop guide proximate the back plane, wherein the loading stop extends substantially across a width of the base frame;

the loading stop preventing glass articles suspended from the receiving racks from contacting the back plate as the magazine apparatus is manipulated thereby mitigating damage to the glass articles; and the plurality of magazine apparatuses are housed in a cassette.

17. The plurality of magazine apparatuses of claim 16, wherein the front plane of a first magazine apparatus is proximate the back plane of an adjacent magazine apparatus.

* * * * *